United States Patent
Di Stefano et al.

(10) Patent No.: US 9,517,502 B2
(45) Date of Patent: Dec. 13, 2016

(54) TOOL HEAD, WITH WIRELESS MONITORING SYSTEM, FOR PERFORMING INDUSTRIAL OPERATIONS

(71) Applicant: Comau S.p.A., Grugliasco (Torino) (IT)

(72) Inventors: Giovanni Di Stefano, Grugliasco (IT); Mauro Maestri, Grugliasco (IT); Valeria Serpi, Grugliasco (IT)

(73) Assignee: Comau, S.p.A., Grugliasco (Torino) (IT)

( * ) Notice: Subject to any disclaimer, the term of this patent is extended or adjusted under 35 U.S.C. 154(b) by 7 days.

(21) Appl. No.: 14/316,965

(22) Filed: Jun. 27, 2014

(65) Prior Publication Data
US 2015/0005939 A1 Jan. 1, 2015

(30) Foreign Application Priority Data
Jul. 1, 2013 (EP) .................................... 13174543

(51) Int. Cl.
*B21D 3/02* (2006.01)
*B23P 19/04* (2006.01)
(Continued)

(52) U.S. Cl.
CPC ......... *B21D 39/023* (2013.01); *B23K 37/0258* (2013.01); *B23P 19/04* (2013.01);
(Continued)

(58) Field of Classification Search
CPC ....... B25J 11/005; B25J 13/006; B25J 13/085; B25J 15/0019; B23K 37/0258; B21D 39/00; B21D 39/02–39/023; B21D 39/031; G05B 2219/33192; G05B 2219/36159; G05B 2219/33273; B23P 19/04; Y10T 29/53065; Y10T 29/53422; Y10T 29/53387
(Continued)

(56) References Cited

U.S. PATENT DOCUMENTS 2,091,474 A  8/1937  Elliot
4,021,909 A  5/1977  Bollmer
(Continued)

FOREIGN PATENT DOCUMENTS

DE  102004042213 A1  3/2006
DE  202011000315 U1  7/2012
(Continued)

OTHER PUBLICATIONS

European Search Report dated Jan. 29, 2014.
(Continued)

*Primary Examiner* — Abby Lin
(74) *Attorney, Agent, or Firm* — Young Basile Hanlon & MacFarlane, P.C.

(57) ABSTRACT

A system for performing industrial operations comprises at least one tool head provided with a tool and at least one sensor associated to the tool head. The system further comprises a control module mounted on the tool head including a data-acquisition unit connected to the sensor configured for acquiring the data coming from said at least one sensor, and a wireless transmission unit connected to the acquisition unit for receiving the aforesaid acquired data and for transmitting the data acquired to a receiving unit in a wireless mode. The module further comprises a device for storing electrical energy for electrical supply of the control module. The system further comprises a wireless charging system for charging the device for storing electrical energy comprising a first charging device carried by the tool head and connected to the energy-storage device and a second charging device associated to a stationary workstation.

12 Claims, 7 Drawing Sheets

(51) Int. Cl.
  *B25J 11/00*    (2006.01)
  *B23K 37/02*   (2006.01)
  *B25J 13/00*    (2006.01)
  *B25J 15/00*    (2006.01)
  *B21D 39/02*    (2006.01)
  *B25J 13/08*    (2006.01)

(52) U.S. Cl.
  CPC .......... *B25J 11/005* (2013.01); *B25J 13/006* (2013.01); *B25J 13/085* (2013.01); *B25J 15/0019* (2013.01); *G05B 2219/33192* (2013.01)

(58) Field of Classification Search
  USPC .................................................. 72/214–220
  See application file for complete search history.

(56) References Cited

U.S. PATENT DOCUMENTS

| | | | |
|---|---|---|---|
| 4,656,858 A | | 4/1987 | Addison |
| 4,955,654 A | * | 9/1990 | Tsuchihashi ........... B25J 13/085 244/172.5 |
| 7,121,129 B2 | | 10/2006 | Binggeli |
| 7,152,447 B2 | | 12/2006 | Toeniskoetter |
| 7,254,973 B2 | | 8/2007 | Campian |
| 7,290,423 B2 | | 11/2007 | Carsley et al. |
| 7,779,524 B2 | | 8/2010 | Campian |
| 7,855,350 B2 | * | 12/2010 | Schurmann ......... B23K 26/023 219/121.63 |
| 7,950,260 B2 | | 5/2011 | Kinouchi et al. |
| 8,024,950 B2 | | 9/2011 | Harrow et al. |
| 2006/0081331 A1 | | 4/2006 | Campian |
| 2006/0122730 A1 | | 6/2006 | Niemela et al. |
| 2006/0158152 A1 | * | 7/2006 | Taniguchi ............... H02J 7/025 320/106 |
| 2007/0209420 A1 | | 9/2007 | Campian |
| 2008/0147089 A1 | * | 6/2008 | Loh .................... A61B 1/00149 606/130 |
| 2008/0302159 A1 | | 12/2008 | Toeniskoetter et al. |
| 2009/0038361 A1 | | 2/2009 | Toeniskoetter |
| 2009/0235712 A1 | | 9/2009 | Padmanabhan et al. |
| 2009/0235713 A1 | | 9/2009 | Toeniskoetter |
| 2010/0241260 A1 | | 9/2010 | Kilibarda et al. |
| 2010/0242561 A1 | | 9/2010 | Reith et al. |
| 2011/0107807 A1 | * | 5/2011 | Sato ...................... B25J 9/1633 72/220 |
| 2011/0153034 A1 | | 6/2011 | Philliben et al. |
| 2011/0172788 A1 | | 7/2011 | Kilibarda et al. |
| 2012/0180559 A1 | * | 7/2012 | Koumoto ............... G01N 27/90 73/115.07 |
| 2012/0197573 A1 | * | 8/2012 | Pecher .................. B25J 9/1692 702/89 |
| 2012/0210802 A1 | * | 8/2012 | Sarh ....................... B23B 35/00 73/862.625 |
| 2012/0247208 A1 | | 10/2012 | Takahashi |
| 2012/0297854 A1 | | 11/2012 | Cyrek et al. |
| 2013/0211418 A1 | * | 8/2013 | Lim .................... A61B 19/2203 606/130 |

FOREIGN PATENT DOCUMENTS

| | | |
|---|---|---|
| FR | 2895690 A1 | 7/2007 |
| WO | 2008145396 A1 | 12/2008 |
| WO | 2012160512 A1 | 11/2012 |

OTHER PUBLICATIONS

Notification of Transmittal, International Search Report and the Written Opinion of the International Searching Authority dated Oct. 24, 2012 from corresponding International Application PCT/IB2012/052562 filed May 22, 2012.

* cited by examiner

TOOL HEAD, WITH WIRELESS MONITORING SYSTEM, FOR PERFORMING INDUSTRIAL OPERATIONS

TECHNICAL FIELD

The present invention relates to systems for performing industrial operations, and more specifically, the type comprising at least one tool head provided with a tool, at least one sensor associated to said tool head and configured for detecting an operating parameter of the tool head, and a control unit for controlling operation of said tool head.

BACKGROUND

In the present description and in the ensuing claims, the term "tool head" is understood to indicate a tool head designed for performing any industrial operation, such as for example a clinching operation or a welding operation, for example electrical spot welding or laser welding, or even only an operation of movement of a piece with the aid of a gripping tool. The term "tool" is understood to indicate any tool or apparatus used on the tool head, such as for example a clinching roller or a pair of electrodes for electrical welding, or an optical device for focusing a laser beam, or a gripping tool.

The invention is in general applicable to any system that envisages the use of a tool head for performing industrial operations. According to a preferred application, the invention regards systems in which the tool head is carried by a robot, in particular a multi-axis industrial robot of the type including a base structure, an articulated robot wrist, to which the tool head is removably connected, and a chain of mutually articulated robot elements that connect the base structure of the robot to the robot wrist. In a specific example, the tool head carried by the robot is a clinching head, provided with one or more clinching rollers prearranged for engaging and rolling along the extension of an edge of a metal sheet to be bent (for example, along the perimeter of a motor-vehicle door structure on a line for the production of motor-vehicle doors). In the case of this specific application, associated to the clinching head are one or more force sensors that detect the load on the clinching rollers during execution of the clinching operation.

As has been mentioned, the present invention is in any case of general application and can be envisaged also in the case of a tool head manoeuvred manually by an operator, such as for example a manually controlled electrical-spot-welding head.

Whatever the type of tool head used and whatever the configuration of the system, there exists the problem of acquiring the data coming from the sensors associated to the tool head with means that are as far as possible simple and of contained dimensions.

It has already been proposed to associate to a tool head carried by a robot a wireless transmission unit that will enable control and monitoring of operation of the tool head in wireless mode (see, for example, the documents Nos. DE 20 2011 000 315 U1 and U.S. 2006-0122730 A1). However, the known systems have not solved the further problem connected to the need to guarantee a high operating autonomy of the system, and to the simultaneous need to avoid use of power-supply cables, which, above all in the case of a tool head carried by a robot, would entail constructional complications and would render operations for replacement of the tool head more laborious.

It would instead be desirable to reduce or eliminate altogether the electrical wiring that connects the tool head to the robot. This wiring is in fact subject to a considerable wear on account of the repeated cycles of deformation to which it is subjected during the service life of the robot and must consequently be replaced periodically, which determines losses of productivity due to the times for stoppages required for replacement operations.

SUMMARY

In order to meet in an optimal way all the aforesaid requirements and solve the above problems, the subject of the present invention is a system having set forth in claim 1.

Thanks to the aforesaid characteristics, the system according to the invention enables provision on the tool head of a data-acquisition and transmission module of very small dimensions, capable of handling a large amount of data and, notwithstanding this, capable of operating substantially continuously for long periods of time.

The system according to the invention solves the problem of wear of the electrical wiring, which, in the known solutions, is necessary for electrical supply of the sensors on board the tool head. According to the invention in fact, the control module mounted on the tool head also comprises a device for storing electrical energy that provides autonomously for electrical supply of all the devices on board the tool head.

Elimination of the wiring consequently enables a drastic reduction of the need for stoppages for maintenance purposes, with consequent increase in productivity.

Elimination of the wiring, in many applications, likewise enables provision of the tool head as a unit that is completely autonomous with respect to the structure that supports it (for example, a robot), with consequent possibility of rapid replacement of the tool head, for example when it is necessary to change the type of machining operation.

At the same time, the system according to the invention can in any case enable easy and rapid wireless charging of the energy-storage device. For this reason, the system according to the invention is substantially different and represents a substantial improvement, as compared to the known systems, in which wireless communication is used simply for exchanging signals between the sensors on board the tool head and the stationary control unit.

The sensors provided on board the tool head may be of any number and of any nature (whether analog or digital). The system according to the invention is in particular able to provide simultaneously for supply and monitoring of a plurality of sensors dedicated to detecting a plurality of different operating parameters of the tool head.

In the invention, an electronic processing unit is provided, designed to process data coming from the above wireless receiving unit and from the above control unit. In practical implementation, however, two or more of the aforesaid three units (the control unit, the stationary wireless receiving unit, and the processing unit) may be associated to or integrated with one another.

In a preferred embodiment, the second charging means and/or the data-receiving unit may be stationary. It is also possible to envisage second stationary charging means associated to and/or integrated in a stationary wireless receiving unit.

In a variant, the workstation with the second charging means and/or the data-receiving unit may be on board the robot, in a part of the robot along the chain of elements that connects the base of the robot to the wrist of the robot in such a way that the robot itself is able to carry the tool head into the vicinity of the part of the robot on which the second charging means and/or the data-receiving unit are provided.

BRIEF DESCRIPTION OF DRAWINGS

Further characteristics and advantages of the invention will emerge from the ensuing description with reference to the annexed drawings, which are provided purely by way of non-limiting example and in which.

DETAILED DESCRIPTION

Figure 1:
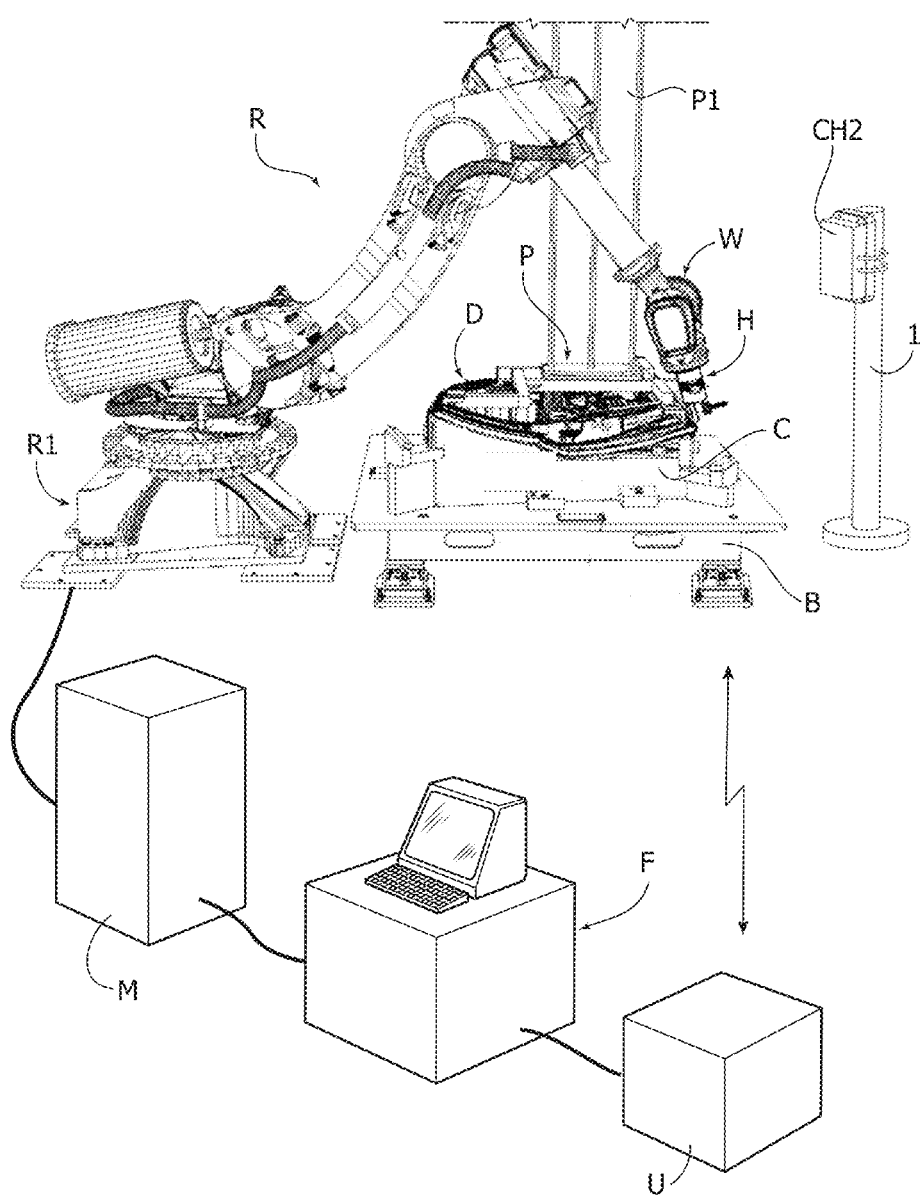
FIG. 1 is a perspective view of a robotized station provided on a line for the production of motor-vehicle doors, for performing the operation of clinching of the two sheet-metal panels constituting the structure of the door along the perimeter of the door.

As already mentioned above, the present invention is of general application. FIG. 1 of the annexed drawings shows, purely by way of example, application of the invention to a clinching station provided along a line for the production of motor-vehicle doors, for performing the operation of clinching of the two sheet-metal panels that constitute the structure of the door along the perimeter of the door.

According to a technique in itself known, the door structure D is laid in a horizontal position above a cradle C carried by a base B. The door structure D is pressed on the cradle C by a pressure member P carried at the bottom end of a vertically mobile column P1. The clinching operation is performed by means of a clinching head H, which is removably mounted on the wrist W of a multi-axis articulated robot R of any known type, comprising a base structure R1 and a plurality of mutually articulated robot elements that connect the base structure R1 to the robot wrist W. Operation of the robot is controlled, in a way in itself known, by means of a stationary controller M of any type in itself known. Consequently, in this specific application, the control unit M of the tool head is the control unit of the robot. However, as already mentioned above, the control unit of the tool head may be any control unit associated to the workstation in which the tool head operates.

Figure 2:
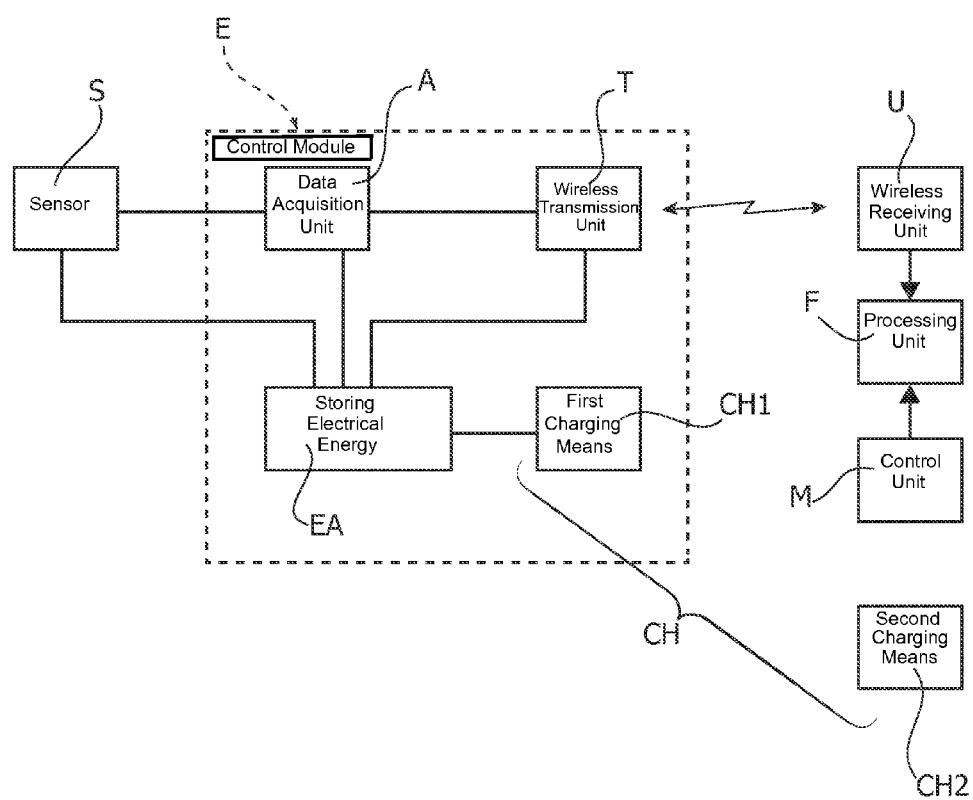
FIG. 2 is a block diagram of the system according to the invention, of which the clinching station of FIG. 1 constitutes an example of application.

With reference also to FIG. 2, which relates in general to the structure of the system according to the invention, also irrespective of the specific application illustrated in FIG. 1, the system comprises at least one sensor S associated to the tool head H and configured for detecting an operating parameter of the tool head. The sensor S is connected to a control module E mounted on the tool head and including a data-acquisition unit A, connected to the sensor S and configured for acquiring the data coming from the sensor S.

The control module E further comprises a wireless-transmission unit T connected to the acquisition unit A for receiving the data acquired by the sensor and configured for transmitting, in wireless modem, the aforesaid acquired data to a wireless receiving unit U.

The data-acquisition unit A may be pre-arranged for carrying out, not only mere acquisition of data, but also an initial processing or treatment of the data prior to their transmission (for example, an analog-to-digital conversion of the signal).

In the preferred embodiment illustrated schematically herein, both the wireless receiving unit U and the control unit M of the robot are connected to an electronic processing unit F that is consequently able to receive from the unit U the data coming from the sensors S and from the unit M the data regarding the operating parameters of the robot, during the operating cycle of the robot (see also FIG. 1).

As already mentioned above, in the practical implementation two or more of the aforesaid three units (the control unit M, the stationary wireless receiving unit U, and the processing unit F) may be associated to or integrated with one another.

The control module E mounted on board the tool head further comprises a device for storing electrical energy EA, for electrical supply of the sensor S, of the data-acquisition unit A, and of the wireless transmission unit T. FIG. 2 is a schematic representation of a direct connection between the device EA and the sensor S. However, in the concrete implementation, the device EA may be pre-arranged for supplying the sensor S both via a direct connection and via the data-acquisition unit A, as well as via interposition of a supply-regulator device of any known type. The same applies of course for electrical supply of all the other devices included in the control module E.

In the system according to the invention, any wireless transmission protocol suited to guaranteeing transmissions in an industrial environment may be used, such as for example the Bluetooth protocol or the Zig-Bee protocol, or the Wi-Fi protocol, or any of the protocols derived therefrom.

Finally, the system comprises wireless charging means CH for charging the device for storing electrical energy EA, which comprise first charging means CH1 carried by the tool head and connected to the energy-storage device EA and second charging means CH2 provided in a position remote from the tool head, for example in a stationary position above a column 1 (as in the example illustrated in FIG. 1). The wireless charging means CH1, CH2 are designed to operate when they are in a position where they are set close up, in any known way, for example by means of an inductive charging system, i.e., providing in the charging means CH1 a turn that concatenates the magnetic flux produced by another turn contained in the charging means CH2.

The second charging means CH2 may also be associated to and/or integrated, for example, in the wireless receiving unit U.

In a variant, the workstation with the second charging means CH2 may be located on board the robot, in a part of the robot along the chain of elements that connects the base of the robot to the wrist of the robot, in such a way that the robot itself is able to carry the tool head into the vicinity of the part of the robot on which the second charging means are provided.

As may be seen, in the system according to the invention not only is wireless transmission of the data coming from the sensors associated to the tool head envisaged, but also wireless charging means that enable charging of the energy-storage device EA, which is to supply both the unit of the control module E, located on board the tool head, and also the sensors S associated to the tool head.

The processing unit F may use and process the data received from the unit U, indicating the parameters detected by the sensors S, associating them to the information received from the robot control unit M, regarding the operating cycle of the robot, so as to obtain precise and immediate information on the functional parameters of the system, during execution of the industrial operation, in modalities correlated to the position of the robot. In the case, for example, of the clinching station illustrated in FIG. 1, the processing unit F will consequently be able to evaluate and associate the corresponding operating parameters to each operating position of the robot.

Figure 3:
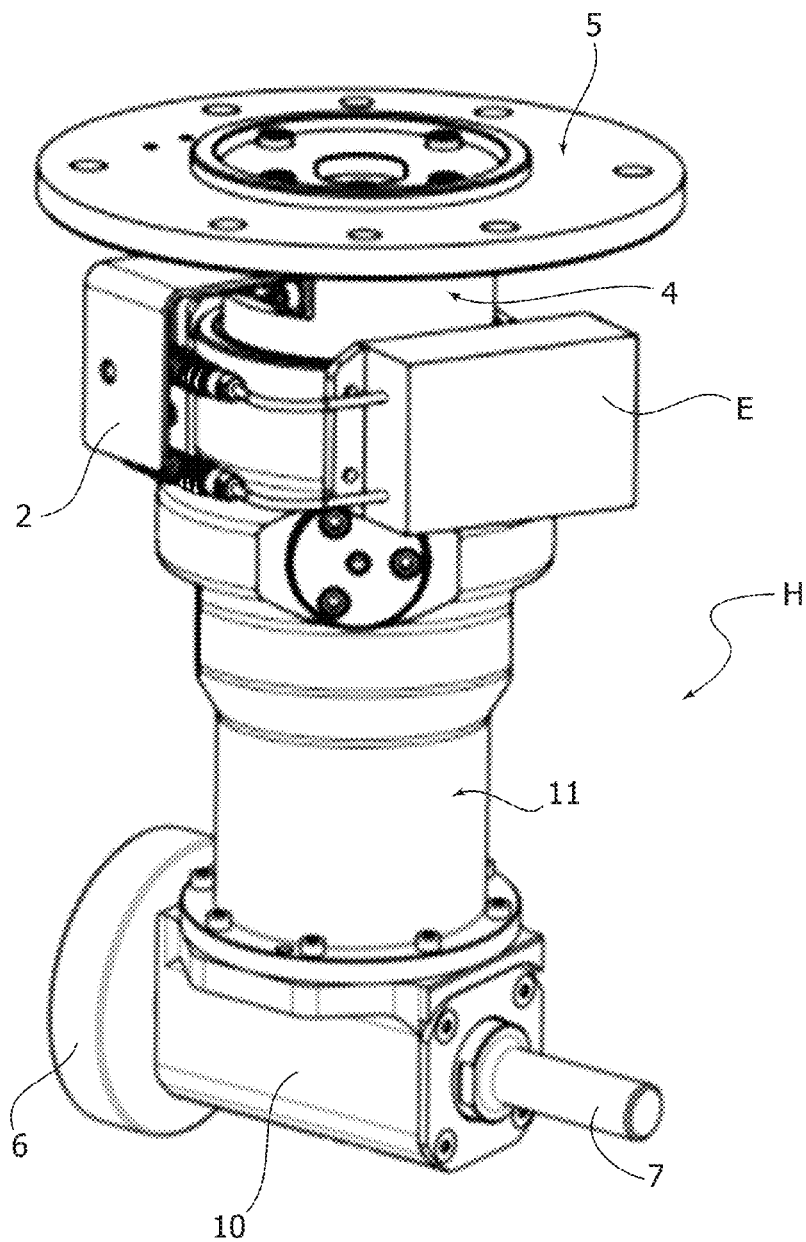
FIG. 3 is a perspective view of the tool head carried by the robot illustrated in FIG. 1.
Figure 4:
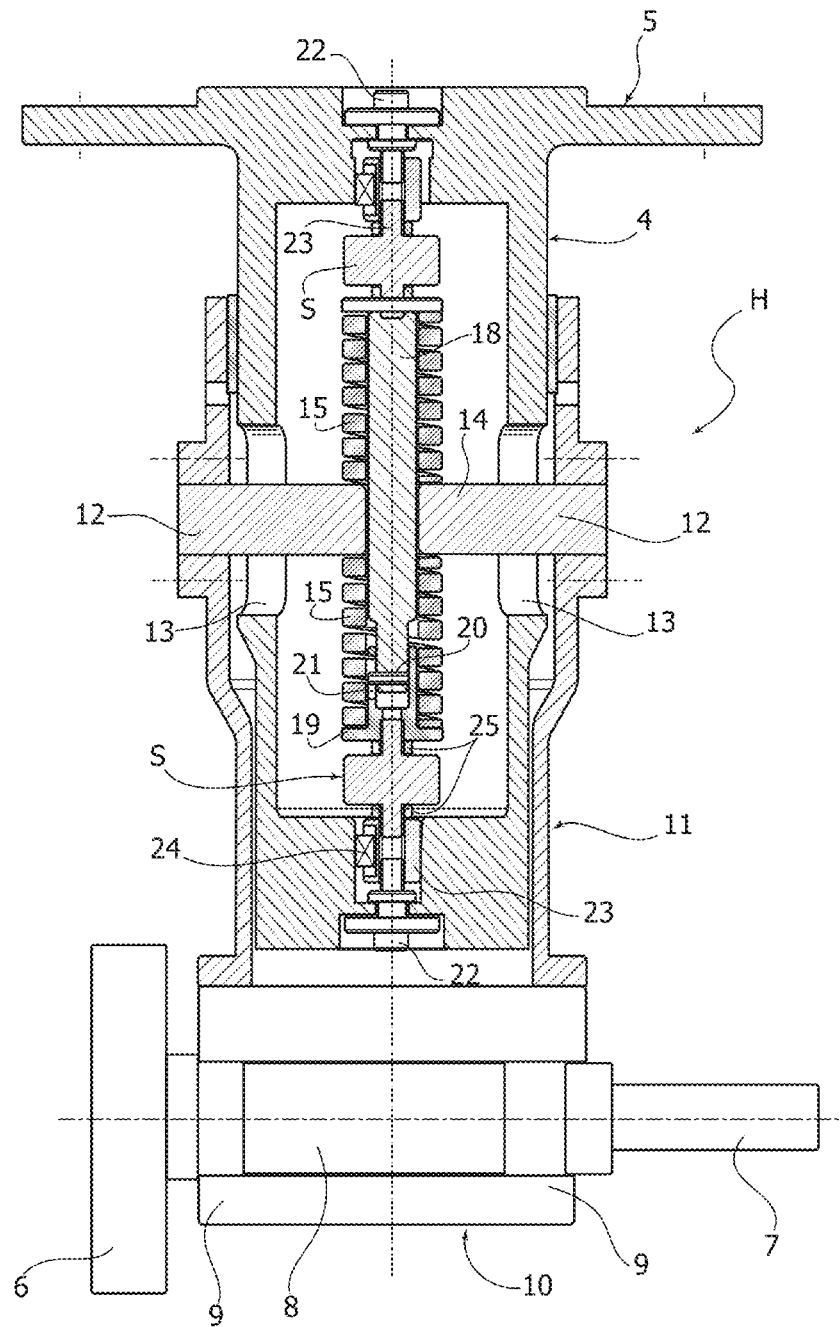
FIG. 4 is a cross-sectional view of the tool head of FIG. 3.
Figure 5:
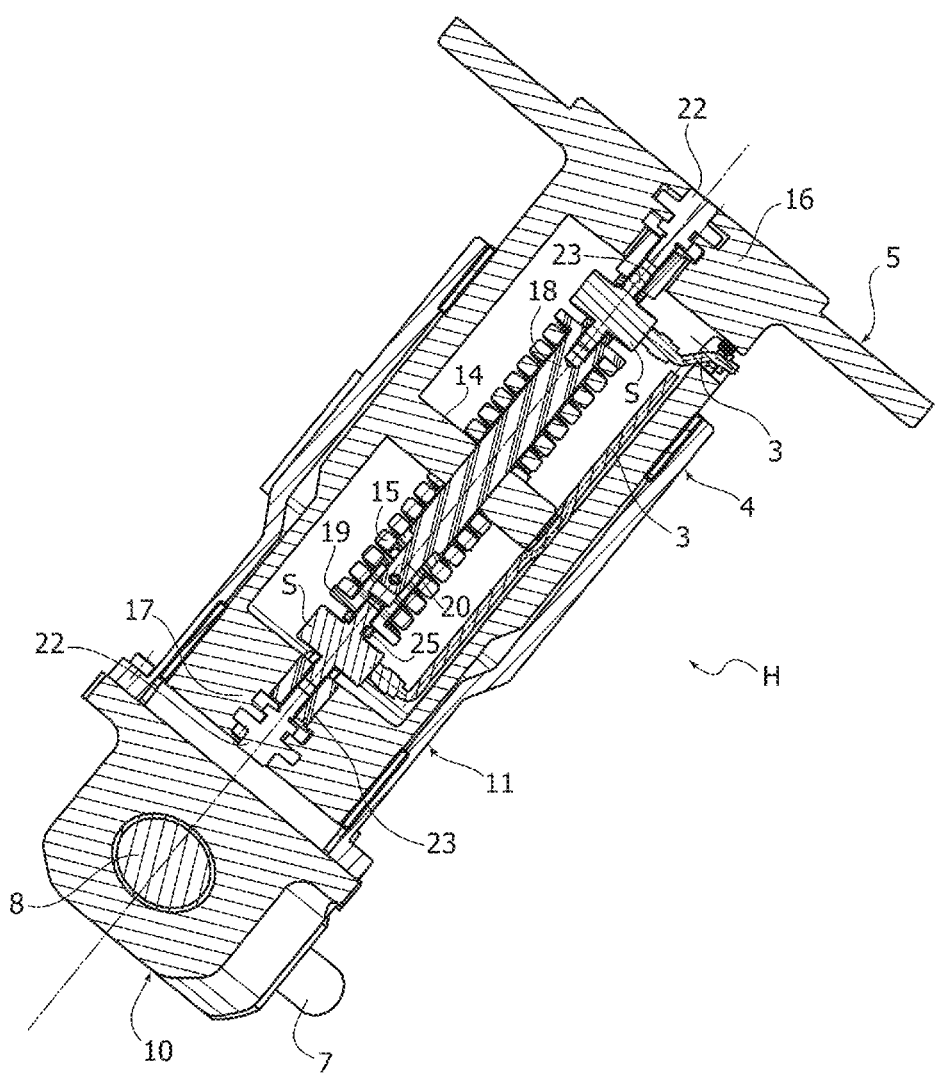
FIG. 5 is a cross-sectional view in a plane orthogonal to that of FIG. 4.
Figure 6:
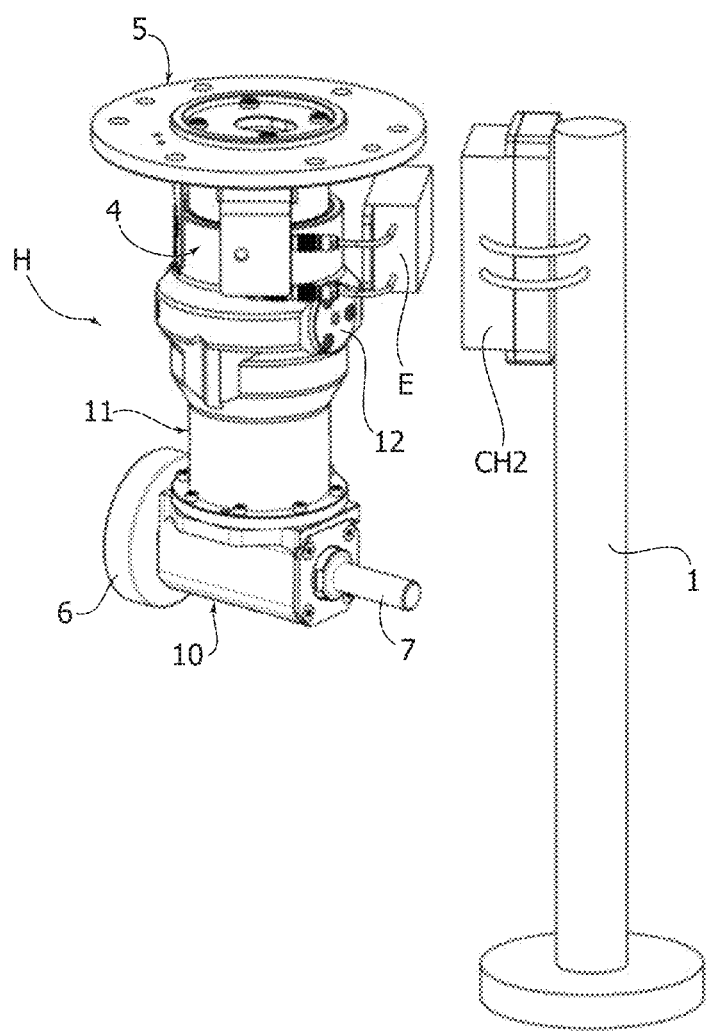
FIG. 6 is a perspective view that shows the tool head carried by the robot of FIG. 1 (the robot not being illustrated in FIG. 6) in the stand-by position adjacent to the workstation for charging the energy-storage device provided on board the tool head.

Represented in the example illustrated in FIG. 3 is the clinching head H provided with the control module E, which is represented schematically in FIG. 2. The module E is connected to a box 2 containing the electrical connectors for connection of the cables 3 (see FIG. 5) that come under the two sensors, which, in the case of the example illustrated, are associated to the clinching head.

In the case of the example of application of the invention to a clinching head, the above tool head may in general be of any known type. For instance, a clinching head that may be used is the one that has formed the subject of the international patent application No. WO 2012/160512 filed in the name of the present applicant. In the preferred embodiment, however, the clinching head presents the further innovative characteristics that will be described hereinafter.

With reference to FIGS. 3-6, the example illustrated of a clinching head H comprises an inner cylindrical body 4 provided at the top with a disk-shaped flange 5, which can be screwed to the wrist of the robot R. At its bottom end, the clinching head H carries two clinching rollers 6, 7, of different diameter, which can be used selectively during clinching operations, according to the need. As may be seen in FIG. 4, the two rollers 6, 7 are carried by one and the same shaft 8, which is rotatably mounted by means of bearings 9 within a roller-carrying assembly 10. The roller-carrying assembly 10 is screwed to the bottom end of a cylindrical body 11, which is slidably mounted on the body 4 of the clinching head H. The wall of the cylindrical body 11 supports two pins 12 diametrally opposite to one another, which pass through longitudinal slits 13 and support on opposite sides a resting element 14, which is thus rigidly connected to the outer cylindrical body 11 of the clinching head H. The resting element 14 has its two opposite faces that function as rests for two respective helical springs 15, the opposite ends of which rest, respectively, against opposite end walls of the inner cylindrical body 4 of the tool head H. Consequently, as may be seen, the opposite ends of the two springs 15 rest against the inner cylindrical body 4, whilst the mutually adjacent ends of the springs 15 rest against the common resting element 14, rigidly connected to the outer cylindrical body 11.

In operation, the robot brings the clinching head H onto the piece so as to get one of the two rollers 6, 7 to roll along the edge of the metal sheet to be bent. This operation can be performed either by pushing the roller 6 or 7 from above downwards (as viewed in FIG. 4) against the metal sheet to be bent, or by pulling (from below upwards) the roller 6 or 7 against the metal sheet to be bent. In the former case, the inner cylindrical body 4 tends to drop with respect to the outer cylindrical body 11 (as viewed in FIG. 4) so that the top spring 15 is compressed, whereas in the latter case, the inner cylindrical body 4 tends to rise with respect to the outer cylindrical body 11 so that it is the bottom spring 15 that is compressed. The load applied on the clinching head is monitored in the two aforesaid cases by means of two respective force sensors (load cells) S that are set between the more distant ends of the springs 15 and the respective resting elements 16, 17.

According to a further important characteristic, the two springs 15 are guided by means of a spring-guide stem 18 set axially through the two springs and through the resting element 14. The bottom end of the spring-guide stem 18 is connected to a disk 19 on which the bottom end of the bottom spring 15 rests by means of a bayonet coupling, including a transverse pin 20 carried by the stem 18 and a shaped slot 21 made in a cylindrical skirt projecting from the disk 19.

The conformation of the slit is such that assembly is obtained according to the conventional modality of bayonet couplings, i.e., with a first axial movement of the disk 19, which brings about a compression of the bottom spring 15, followed by a rotation of the disk 19 and subsequent axial release, under the thrust of the bottom spring 15, towards a final blocked position. Blocking of the connection is consequently guaranteed by the bottom spring 15 itself.

Thanks to this arrangement, mounting of the assembly may be carried out in a simple and rapid way.

The load of the two springs 15 can be regulated by acting, at each of the two more distant ends of the springs, on a screw 22 that engages an internally threaded bushing 23, which is prevented from turning with respect to the body 11 by means of a key 24 and that moreover engages a threaded shank 25 projecting from the body of the respective sensor S. A rotation of the screw 22 enables modification of the axial position of the threaded bushing 23 with respect to the resting element 16 or 17.

During the operation of adjustment of the load of the springs 15, the relative axial position of the outer cylindrical body 11 and of the inner cylindrical body 4 is blocked by inserting a blocking pin through aligned holes (not visible in the drawings) of the aforesaid cylindrical bodies.

The system described above for adjustment of the load of the springs 15 represents a substantial step forwards with respect to what has been envisaged so far in systems of the type illustrated in the document No. WO 2012/160512. In the above known systems for controlling the load of a spring it is necessary to measure the free length of the spring, to measure the effective length of the compartment in which it is mounted, and to insert a series of shims or washers that will guarantee the desired compression. Once again in these known systems, if the spring fails prior to its replacement, it is necessary to measure the new spring, to revise the size of the mounting compartment, and to provide the shims necessary for recreating the same value of load.

With the new adjustment system described above, it is possible to adjust in a fine way the value of the load, reproducing exactly one and the same value of load, albeit changing the spring (the tolerance on the length of the spring is wide) in so far as with the screw 22 it is possible to recover any play and to recreate the desired load. In this way, it is possible to reproduce exactly identical calibrations between different clinching heads, irrespective of the constructional tolerances of the systems. Moreover, with the sensor S it is possible to assess the integrity of the spring during use of the tool head.

As already mentioned above, FIG. 6 shows the stand-by position of the clinching head H, in which the control module E, and in particular the charging unit CH1, is located in the proximity of the charging unit CH2 to enable inductive charging of the energy-storage device EA.

As already mentioned above, the receiving unit U, like the second charging means CH2, may be provided on board the robot, in a part of the robot along the chain of elements that connects the base of the robot to the wrist of the robot, in such a way that the robot itself is able to bring the tool head into the vicinity of the part of the robot on which the charging unit is provided.

Figure 7:
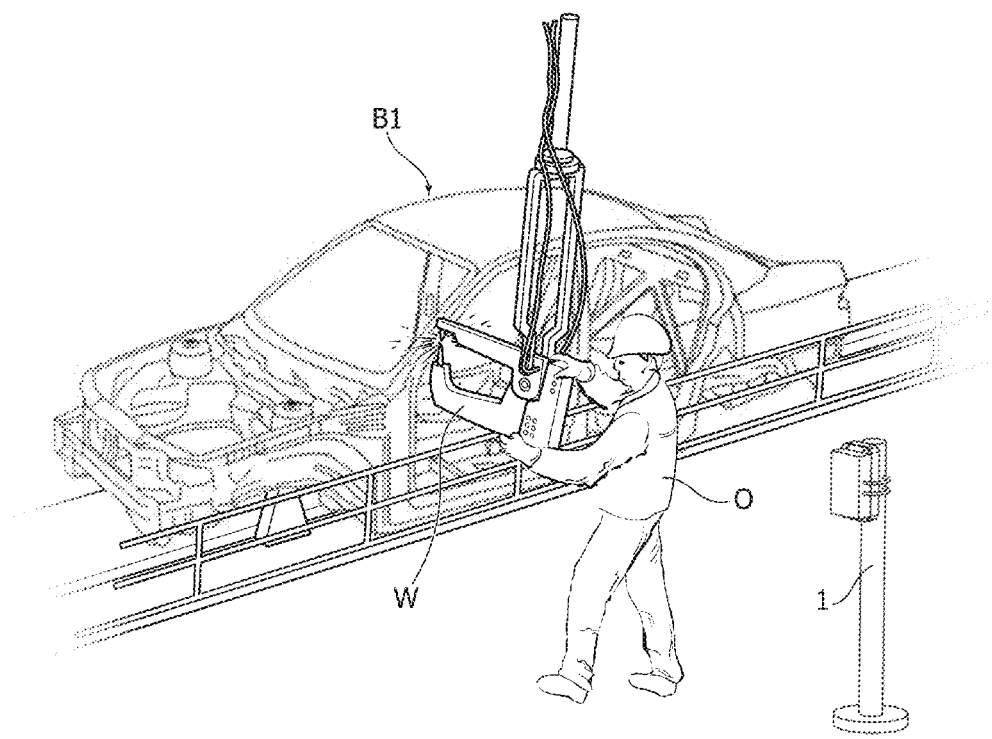
FIG. 7 is a perspective view that shows a manual welding station along a line for production of motor-vehicle bodies.

FIG. 7 shows a different embodiment not forming part of the invention, in which the tool head is constituted by an electrical spot-welding yoke W manually controlled by an operator O for performing electrical spot-welding on a body B1 in a motor-vehicle body assembly line. There may be associated to the welding head W, in a way in itself known, sensors for detecting the load applied on the welding electrodes. Also here, there is in any case provided on board the tool head W a control module E of the type illustrated in FIG. 2, which enables the data detected to be sent to a unit U so as to enable the processing unit F to process these data and correlate them to the operating cycle executed. Also in this case, a stationary workstation 1 is provided for charging the energy-storage device EA incorporated in the welding head W. In this application, the control unit M of the tool head (not illustrated in FIG. 7) is constituted by a control unit of the workstation or of the line in which the welding head W is used.

Of course, without prejudice to the principle of the invention, the details of construction and the embodiments may vary widely with respect to what has been described and illustrated herein, purely by way of example, without thereby departing from the scope of the present invention.

What is claimed is:

1. A system for performing industrial operations, comprising:
    a multi-axis industrial robot including a base structure, an articulated robot wrist, and a chain of mutually articulated robot elements that connect said base structure to said robot wrist;
    at least one clinching head provided with a clinching tool, the clinching head comprising:
        an assembly carrying at least one clinching roller, said roller-carrying assembly being mounted at the bottom end of an outer cylindrical body slidably mounted on an inner cylindrical body having a top end provided with a flange for connection to the wrist of the robot and a bottom end;
        a top helical spring and a bottom helical spring set aligned coaxially within said inner cylindrical body, the more distant ends of said top and bottom springs being applied against end elements of said inner cylindrical body, the mutually contiguous ends of said top and bottom springs resting on opposite faces of an intermediate resting element that is rigidly connected to said outer cylindrical body via supporting pins diametrically opposite to one another rigidly connected to said outer cylindrical body and set through longitudinal slits of said inner cylindrical body, said top and bottom springs being provided with a spring-guide stem set axially through said springs and through said intermediate resting element, the more distant ends of said top and bottom springs reacting against the respective top and bottom end elements of the inner cylindrical body with interposition of two force sensors;
    said clinching head is removably connected to said robot wrist, the two force sensors adapted to detect a load applied on the clinching tool carried by said clinching head during a clinching operation;
    a control unit for controlling operation of said clinching head;
    a control module mounted on said clinching head, the control module further comprising:
        a data-acquisition unit connected to said two force sensors and adapted for acquiring data coming from said two force sensors; and
        a wireless transmission unit connected to said acquisition unit for receiving the aforesaid acquired data and adapted for transmitting said acquired data in a wireless mode to a wireless receiving unit remote from the clinching head;
        a device for storing electrical energy for electrical supply of said data acquisition unit, of said wireless transmission unit, and of said two force sensors; and
    wireless means for charging said device for storing electrical energy, the means for charging including inductive charging means comprising:
        first charging means carried by said clinching head and connected to said device for storing electrical energy; and
        second charging means connected to a workstation remote from the clinching head and co-operating in a wireless mode with said first charging means.

2. The system according to claim 1, wherein said force sensors are connected by means of respective cables to the aforesaid acquisition unit forming part of said control module, said control module being mounted on said inner cylindrical body.

3. The system according to claim 1, further comprising first screw means for adjustment of the load of said bottom spring and second screw means for adjustment of the load of said top spring.

4. The system according to claim 1, wherein the bottom spring bottom end further comprises a cylindrical skirt having a shaped slit co-operating with a diametric pin projecting from said spring-guide stem to enable mounting via bayonet coupling of said resting disk on the bottom end of said spring-guide stem.

5. The system according to claim 3, wherein each of said first and second screw adjustment means comprise a screw rotatably mounted in an axially fixed position on a respective one of said top and bottom end elements of said inner cylindrical body, and an internally threaded bushing, prevented from turning with respect to the end element and engaged by said screw, said bushing being moreover engaged on a threaded shank of a force sensor associated to the respective spring.

6. The system according to claim 1, further comprising first screw means for adjustment of the load of said bottom spring and second screw means for adjustment of the load of said top spring.

7. The system according to claim 2, wherein the bottom spring bottom end further comprises a cylindrical skirt having a shaped slit co-operating with a diametric pin projecting from said spring-guide stem to enable mounting via bayonet coupling of said resting disk on the bottom end of said spring-guide stem.

8. A system for performing clinching operations, the system comprising:

a multi-axis industrial robot including a base structure, an articulated robot wrist, and a chain of mutually articulated robot elements that connect said base structure to said robot wrist;

at least one clinching head provided with a clinching tool, the clinching head further comprising:

an assembly carrying at least one clinching roller, said roller-carrying assembly being mounted at the bottom end of an outer cylindrical body which is slidably mounted on an inner cylindrical body having a top end provided with a flange for connection to the wrist of the robot;

two springs arranged within said inner and outer cylindrical bodies so as to react to relative sliding movements between said inner and outer cylindrical bodies in two opposite directions, respectively, at least one load sensor interposed between one of said springs and one of said inner or outer cylindrical bodies so as to detect a load applied on the at least one clinching roller carried by said roller-carrying assembly while the clinching head advances relative to a piece during a clinching operation;

a control unit for controlling operation of said clinching head;

a control module mounted on said clinching head, the control module further comprising:

a data-acquisition unit connected to said at least one load sensor and adapted for acquiring data coming from said sensor; and a wireless transmission unit connected to said acquisition unit for receiving the aforesaid acquired data and adapted for transmitting said acquired data in a wireless mode to a wireless receiving unit remote from the clinching head;

an electronic processing unit adapted to process data coming from said wireless receiving unit and from said control unit during an operating cycle of said robot in which said clinching head performs a clinching operation on a piece, the electronic processing unit being configured to process data received from the wireless receiving unit indicating the load detected by the at least one sensor while the clinching head advances relative to said piece during the clinching operation, said electronic processing unit being further adapted to associate said load data received from the wireless receiving unit to information received from the control unit during the clinching operation, so that a correlated information is obtained on the load on said at least one clinching roller of the clinching head during the clinching operation, as a function of a position of the clinching head during its movement relative to the piece;

a device for storing electrical energy for electrical supply of said data acquisition unit, of said wireless transmission unit, and of said force sensor; and a wireless inductive charging device for charging said device for storing electrical energy, the charging device comprising:

a first charging device carried by said clinching head connected to the robot wrist, the first charging device connected to said device for storing electrical energy; and a second charging device connected to a workstation remote from the clinching head and co-operating in a wireless mode with said first charging means.

9. A method for performing a material deforming clinching operation for use with a multi-axis industrial robot having a robot wrist, a clinching tool having an outer cylinder connected to the clinching tool and an inner cylinder removably connected to the robot wrist and coaxially positioned and axially movable with respect to the outer cylinder, the clinching tool further having a first and a second spring axially aligned and connected to the inner cylinder and a first load sensor in communication with one of the springs, the method comprising the steps of:

moving the robot and connected clinching tool into contact with a piece through a control unit;

compressing one of the first and second springs to apply a predetermined compressive force on the piece by the tool through the control unit;

advancing the clinching tool along a predetermined path on the piece;

continually measuring the applied compressive force by the first load sensor;

generating applied compressive force data through a data acquisition unit (A) in a control module mounted to the clinching tool;

wirelessly transmitting the measured compressive force data from a wireless transmission unit in the control module to a wireless receiving unit positioned remotely from the robot and connected clinching tool;

correlating the measured compressive force data for each position of the clinching tool along the piece received from the wireless transmission unit with information received from the control unit;

selectively positioning a first charging device connected to the clinching tool and robot wrist in positional proximity to a second charging device positioned remotely from the robot; and wirelessly charging a device for storing electrical energy connected to the clinching tool in electrical communication with the first charging device through induction between the first and the second charging devices.

10. The method of claim 9 further comprising the step of adjusting the positon of robot and clinching tool by the control unit to apply more compressive force or less compressive force on the piece based on the correlation of measured compressive force data and the control unit information.

11. A system for performing clinching operations, the system comprising:

a multi-axis industrial robot including a base structure, an articulated robot wrist, and a chain of mutually articulated robot elements that connect said base structure to said robot wrist;

at least one clinching head provided with a clinching tool, the clinching head further comprising:

an assembly carrying at least one clinching roller, said roller-carrying assembly being mounted at the bottom end of an outer cylindrical body which is slidably mounted on an inner cylindrical body having a top end provided with a flange for connection to the wrist of the robot;

two springs arranged within said inner and outer cylindrical bodies so as to react to relative sliding movements between said inner and outer cylindrical bodies in two opposite directions, respectively, at least one load sensor interposed between one of said springs and one of said inner or outer cylindrical bodies so as to detect a load applied on the at least one clinching roller carried by said roller-carrying assembly while the clinching head advances relative to a piece during a clinching operation;

a control unit for controlling operation of said clinching head;

a control module mounted on said clinching head, the control module further comprising:
  a data-acquisition unit connected to said at least one load sensor and adapted for acquiring data coming from said sensor; and
  a wireless transmission unit connected to said acquisition unit for receiving the aforesaid acquired data and adapted for transmitting said acquired data in a wireless mode to a wireless receiving unit remote from the clinching head;
  an electronic processing unit adapted to process data coming from said wireless receiving unit and from said control unit during an operating cycle of said robot in which said clinching head performs a clinching operation on a piece, the electronic processing unit being configured to process data received from the wireless receiving unit indicating the load detected by the at least one sensor while the clinching head advances relative to said piece during the clinching operation, said electronic processing unit being further adapted to associate said load data received from the wireless receiving unit to information received from the control unit during the clinching operation, so that a correlated information is obtained on the load on said at least one clinching roller of the clinching head during the clinching operation, as a function of a position of the clinching head during its movement relative to the piece; and a device for storing electrical energy for electrical supply of said data acquisition unit, of said wireless transmission unit, and of said force sensor.

12. A method for performing a material deforming clinching operation for use with a multi-axis industrial robot having a robot wrist, a clinching tool having an outer cylinder connected to the clinching tool and an inner cylinder removably connected to the robot wrist and coaxially positioned and axially movable with respect to the outer cylinder, the clinching tool further having a first and a second spring axially aligned and connected to the inner cylinder and a first load sensor in communication with one of the springs, the method comprising the steps of:
  moving the robot and connected clinching tool into contact with a piece through a control unit;
  compressing one of the first and second springs to apply a predetermined compressive force on the piece by the tool through the control unit;
  advancing the clinching tool along a predetermined path on the piece;
  continually measuring the applied compressive force by the first load sensor;
  generating applied compressive force data through a data acquisition unit (A) in a control module mounted to the clinching tool;
  wirelessly transmitting the measured compressive force data from a wireless transmission unit in the control module to a wireless receiving unit positioned remotely from the robot and connected clinching tool;
  correlating the measured compressive force data for each position of the clinching tool along the piece received from the wireless transmission unit with information received from the control unit.

* * * * *